United States Patent [19]

Crofts

[11] 4,407,888

[45] Oct. 4, 1983

[54] DIMENSIONALLY RECOVERABLE ARTICLE WITH ADHESIVE PORTION

[75] Inventor: David Crofts, Keynes, England

[73] Assignee: Raychem Limited, England

[21] Appl. No.: 211,803

[22] Filed: Dec. 1, 1980

[30] Foreign Application Priority Data

Dec. 7, 1979 [GB] United Kingdom ............... 7942293

[51] Int. Cl.³ .......................... C09J 7/02; B32B 27/06
[52] U.S. Cl. .................................. 428/355; 428/480; 428/482; 428/483; 428/520; 428/913; 428/458; 156/244.11; 528/301; 264/230; 138/155
[58] Field of Search .............. 428/482, 480, 483, 520, 428/355; 264/230; 528/301

[56] References Cited

U.S. PATENT DOCUMENTS

| | | | |
|---|---|---|---|
| 2,027,962 | 1/1936 | Currie | 264/230 |
| 3,464,852 | 9/1969 | Caldwell et al. | 428/482 X |
| 3,651,014 | 3/1972 | Witsiepe | |
| 3,766,146 | 10/1973 | Witsiepe | |
| 3,787,520 | 1/1974 | Hoeschele | 528/301 |
| 4,041,206 | 8/1977 | Tsunashima et al. | 428/482 X |
| 4,093,675 | 6/1978 | Schure et al. | 428/482 X |
| 4,236,949 | 12/1980 | Horsma et al. | 264/230 X |
| 4,246,687 | 1/1981 | Nolf | 264/230 X |
| 4,275,180 | 6/1981 | Clarke | 525/173 |

FOREIGN PATENT DOCUMENTS

| | | |
|---|---|---|
| 2263281 | 10/1975 | France . |
| 990235 | 4/1965 | United Kingdom . |
| 2000790 | 1/1979 | United Kingdom . |

OTHER PUBLICATIONS

Chemical Abstracts, vol. 89, No. 4, Jul. 24, 1978, p. 59, No. 25663u.
Chemical Abstracts, vol. 79, No. 10, Sep. 10, 1973, p. 58, No. 54539g.

*Primary Examiner*—P. Ives
*Attorney, Agent, or Firm*—Douglas A. Chaikin; Herbert G. Burkard

[57] ABSTRACT

A dimensionally-recoverable article which is particularly suitable for the manufacture or repair of cable harnesses has a dimensionally-recoverable portion formed from a material comprising a crosslinked segmented polyether-ester block copolymer and an adhesive portion comprising a polyether-ester random copolymer which portions are bonded together to form a single integral structure.

17 Claims, 1 Drawing Figure

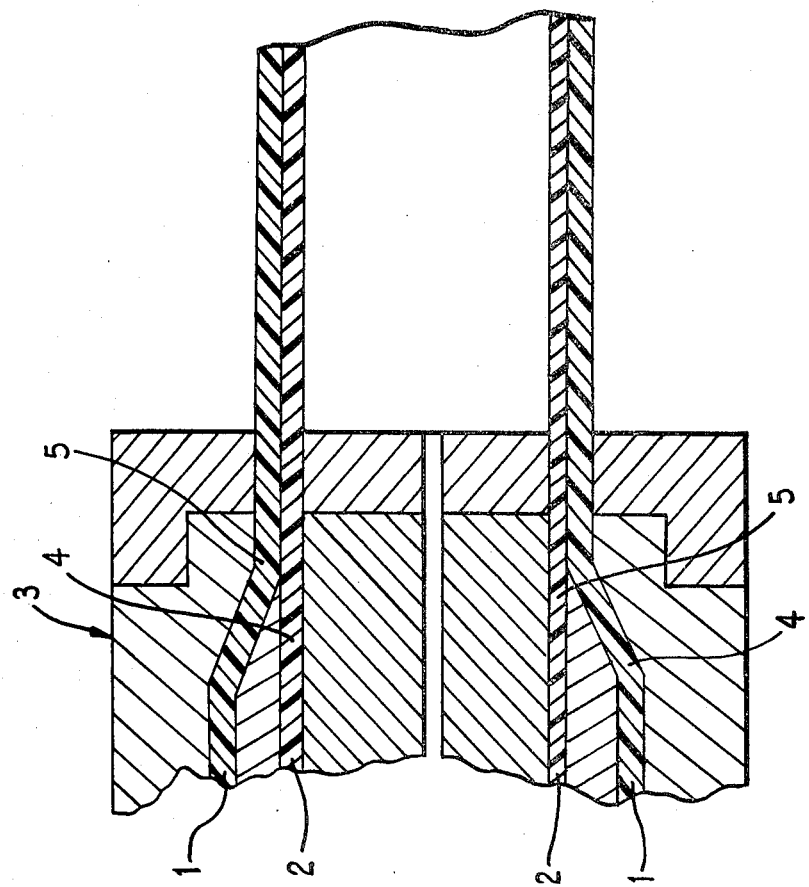

DIMENSIONALLY RECOVERABLE ARTICLE WITH ADHESIVE PORTION

This invention relates to articles having adhesive portions and to a process for their production.

In particular, the invention relates to dimensionally recoverable articles, that is to say, articles, the dimensional configuration of which may be made substantially to change when subjected to the appropriate treatment. Of particular interest are heat recoverable articles, the dimensional configuration of which may be made substantially to change when subjected to heat treatment. Heat recoverable articles may be produced by deforming a dimensionally heat stable configuration to a dimensionally heat unstable configuration, in which case the article will assume, or tend to assume, the original heat stable configuration on the application of heat alone. According to one method of producing a heat recoverable article, a polymeric material is first extruded or molded into a desired shape. The polymeric material is then crosslinked or given the properties of a cross-linked material by exposure to high energy radiation for example a high energy electron beam or atomic pile radiation. The cross-linked polymeric material is heated and deformed, and then locked in the deformed condition by quenching or other suitable cooling means. The deformed material will retain its shape almost indefinitely until exposed to a temperature above its crystalline melting temperature, for example about 120° C. in the case of polyethylene. Examples of heat-recoverable articles may be found in U.S. Pat. No. 2,027,962 and in UK Patent Specification No. 990,235. As is made clear in U.S. Pat. No. 2,027,962, however, the original dimensionally stable heat-treatment configuration may be a transient form in a continuous process in which, for example an extruded tube is expanded, while hot, to a dimensionally heat unstable form.

One field in which dimensionally recoverable articles have gained considerable importance is the protection of wires and cables from mechanical and environmental damage. For example they are used extensively in the production of cable harnesses, end seals and parts for the protection of cable terminations, branch outs and the like where they are required to protect the cable both from damage caused by handling the cable and from the deleterious effects of water, solvents, oil and other liquids.

Often, for example, in the production of cable harnesses where different dimensionally recoverable articles are used to protect different parts of the cable, or where the articles are used as end seals, it is necessary to provide the articles with a coat of adhesive either during production or installation in order to prevent ingress of liquids between the articles or between the article and cable. While the use of hot-melt adhesives has the advantage that they may be applied to the articles during manufacture, they are usually more susceptible to attack by solvents than the articles themselves. Accordingly, since the performance of the dimensionally recoverable articles will depend on the quality of the adhesive bond, hot-melt adhesives cannot be used with "high-performance" articles which are intended to be used in environments where they may come in contact with agressive liquids. It has therefore been necessary to bond such "high-performance" articles using epoxy adhesives which, by their nature, have to be applied to the articles during installation. This has the disadvantage that the installation time is increased and that the quality of the adhesive bond is, to a large extent, dependant on the skill of the person installing the article.

The present invention provides an article which comprises a dimensionally recoverable portion, preferably a heat-recoverable portion formed from a material comprising a crosslinked segmented polyether-ester block copolymer, and an adhesive portion comprising a polyether-polyester random copolymer which portions are bonded together to form a single integral structure.

The article according to the invention is advantageously a tubular article and preferably one in which the dimensionally recoverable portion forms an outer wall of the article and the adhesive portion forms an inner wall. The article preferably has dimensions that allow it to be used for protecting cables in cable harnesses.

The segmented polyether-ester block copolymers are preferably those consisting essentially of recurring intralinear long chain ether units and short chain ester units randomly joined head-to-tail through ester linkages, said long chain ester units being represented by the formula:

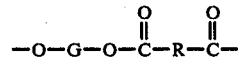

and said short chain ester units being represented by the formula:

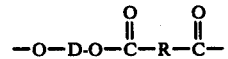

where G is a divalent radical remaining after the removal of terminal hydroxyl groups from at least one long chain glycol having a molecular weight of about 600–6000; R is a divalent radical remaining after removal of carboxyl groups from at least one dicarboxylic acid having a molecular weight less than about 300; and D is a divalent radical remaining after removal of hydroxy groups from at least one low molecular weight diol having a molecular weight less than 250.

Exemplary of the preferred segmented polyether-ester copolymers are the copolymers derived from terephthalic acid, polytetramethylene ether glycol and 1,4-butanediol. These are random block copolymers having crystallizable hard blocks with the repeating unit

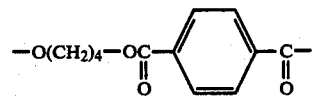

and amorphous, elastomeric, polytetramethylene ether terephthalate soft blocks of the repeating unit

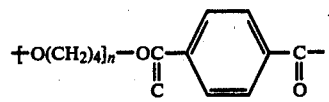

having a molecular weight of from about 600–3000, i.e. n=6–40. Such copolymers are commercially available from the DuPont Co., under the registered trademark "Hytrel". Pertinent information regarding their structure, properties and methods of preparation are to be found in U.S. Pat. Nos. 3,023,192, 3,651,014, 3,763,109, 3,766,146 and 3,784,520 and in Belgian Pat. No. 793,332, the disclosures of which are incorporated herein by reference. Additional information is found in "Segmented Polyether Ester Copolymers-A-New Generation of Thermoplastic Elastomers" by G. K. Hoeschele published by the Elastomers Department E. I. DuPont De Nemours, Inc., Wilmington, De., and references cited therein, all of which are also incorporated by reference.

Mixtures of any of the above polymers may be used where appropriate.

The segmented polyether-ester block copolymers may constitute the sole polymeric material of the dimensionally recoverable portion or they may be blended with one or more other polymers, preferably with one or more elastomers. Preferred elastomers for use in the present invention include ethylene/acrylic ester polymers and ethylene/vinyl acetate polymers, especially those containing at least 3.6 moles of ethylene per 1000 grams of polymer. Examples of suitable elastomers include:

(a) An ethylene/alkyl acrylate or ethylene/alkyl methacrylate copolymer, wherein the alkyl group has 1-4 carbon atoms; the proportion of the acrylic ester being about 2.5-8.0 moles of ester groups per kilogram of the copolymer.

(b) A terpolymer of ethylene with an alkyl acrylate or methacrylate wherein the alkyl group has 1-4 carbon atoms, and a third copolymerizable monomer, which may be, for example one of the following:
  (i) a $C_1$-$C_{12}$ alkyl monoester or diester of a butanedioic acid,
  (ii) acrylic acid,
  (iii) methacrylic acid,
  (iv) carbon monoxide,
  (v) acrylonitrile,
  (vi) a vinyl ester,
  (vii) an alkyl acrylate or alkyl methacrylate, the alkyl group having at least five carbon atoms; and
  (viii) maleic anhydrate; or (c) Ethylene/vinyl acetate copolymers especially those containing at least 35% by weight vinyl acetate.

In the above terpolymer the proportion of the acrylic ester is equivalent to about 2.5-8.0 moles of ester groups per kilogram of the polymer, and the proportion of the third monomer is no higher than about 10 weight percent of the polymer.

The elastomer can be a simple copolymer of ethylene with method acrylate, ethyl acrylate, propyl acrylate isopropyl acrylate, a butyl acrylate, methyl methacrylate, ethyl methacrylate, propyl methacrylate, isopropyl methacrylate, a butyl methacrylate or vinyl acetate. Such copolymers which are not commercially available, can be made by conventional and well known methods. These copolymers should have a melt index within the range of 0.1-70 at 190° C., preferably 0.5-15 as measured by ASTM method number D-1238-52T, or the substantially equivalent method ASTM D-1238-73.

The terpolymer of ethylene with an acrylic ester and a third monomer may contain as the third monomer an ester of fumaric acid or maleic acid, wherein the alcohol moiety can be, for example, methyl, ethyl, propyl, isopropyl, various isomers or butyl, pentyl, hexyl, heptyl, octyl, nonyl, decyl, undecyl, dodecyl and the like. The third monomer may also be, among others, a vinyl ester such as for example, vinyl acetate or vinyl butyrate. It can also be an acrylic ester such as, for example, various isomeric forms of pentyl, hexyl, heptyl, octyl, nonyl, decyl, undecyl, dodecyl, pentadecyl and octadecyl acrylate and methacrylates. It is not practical to use as the third momomer an acrylic ester in which the alcohol moiety contains more than 18 carbon atoms.

Excellent results have been obtained using as the elastomer component of the polymer composition a terpolymer of ethylene, methyl acrylate and a cure-site monomer comprising carboxyl groups for example terpolymers which are available from DuPont under the trade name Vamac.

Details concerning this material are to be found in a brochure available from DuPont entitled "Vamac ethylene/acrylic Elastomer-A new Class of Heat & Oil Resistant Rubber" the disclosure of which is incorporated herein by reference.

Mixtures of any of the above mentioned elastomers with each other or with other elastomers may be used where appropriate although it has been found that the presence of hydrocarbon elastomers has a deleterious effect upon the oil resistance of the polymer composition and thus these are preferably not included, or if present, are preferably incorporated in an amount of not more than 5% by weight based on the total weight of the polymer composition.

The elastomer and the polyether-ester block copolymer may be blended in a wide range of proportions depending upon the physical requirement of the polymer composition. Preferred compositions will however contain the elastomer and the thermoplastic polymer in a weight ratio of from 4:1 to 1:4 and most preferably in a ratio of from 2.5:1 to 1.2:5. Particularly good results have been obtained using a blend of an ethylene/acrylic ester elastomer and a segmented polyether-ester block copolymer in proportions of from 50 to 150 parts by weight of the ethlene/acrylic ester elastomer per 100 parts by weight of the segmented copolyester.

In addition to the polymers additional conventional additives may also be present for example, fillers, ultra violet stabilisers, antioxidants, acid acceptors, anti-hydrolysis stabilisers and colourants, in minor proportions e.g. in amounts of usually not more than 40% by weight.

The polymer material of the dimensionally recoverable portion may be cross-linked by any convenient method, for example by irradiation or, by chemical cross-linking using, for example, a peroxide. Suitable peroxides are those that decompose rapidly within the range of 150° C.-250° C. These include, for example, dicumyl peroxide, 2,5-bis-(t-butylperoxy)2,5-dimethylhexane, and α,α-bis(t-butylperoxy)di-isopropylbenzene. In a typically chemically cross-linkable composition there will be about 0.5-5 parts by weight of peroxide per 100 parts of polymer composition. The peroxide may be absorbed on an inert carrier such as a calcium carbonate, carbon black, or Kieselguhr; however, the weight of the carrier is not included in the above range.

Preferably, however, the polymeric materials are cross-linked using high energy radiation. Radiation dose levels to achieve cross-linking according to the present invention may range from about 2 to 80 Mrads or more, but a dose of about 5 to 50 Mrads is preferred. For most purposes a dose of about 8 to 20 Mrads will be effective.

In some cases it may be desirable to add to the cross-linkable polymer composition a co-agent to assist in the cross-linking reaction. Such co-agents usually contain multiple unsaturated groups such as alkyl or acrylic esters. While their mode of action is not known with certainty, it is believed that they react with the initial radical formed on the polymer backbone to form a more stable radical, which undergoes coupling reactions to form cross-links more readily than chain scission reactions.

The co-agent can be for example, $N,N^1$-m(phenylene)-dimaleimide, trimethylolpropane trimethylacrylate, tetraallyoxyethane, triallyl cyanurate, triallyl isocyanurate, tetramethylene acrylate, or polyethylene oxide glycol dimethacrylate. The amount of the co-agent is preferably up to about 5 parts by weight per 100 parts of the polymer composition and preferably from 1 to 3 parts by weight per 100 parts of the polymer composition.

The adhesive portion of the article according to the present invention preferably comprises a hot-melt adhesive, and especially one based on a random copolymer of at least one dicarboxylic acid preferably an aromatic dicarboxylic acid, having a molecular weight of less than 300 and a plurality of glycols each having a molecular weight of less than 600. Preferred polyether-ester random copolymers are those in which the glycol units are derived from one or more polymerised glycols having varying degrees of polymerisation. An example of such a copolymer is one having a repeating unit of the general formula

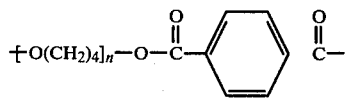

in which n is an integer that varies randomly throughout the copolymer, preferably from 1 to 7, and especially from 1 to 6.

By using an adhesive based on a polyether-ester random copolymer, and in particular, one based on polytetramethylene glycol and terephthalic acid, it is possible to form articles having considerably enhanced adhesion to a number of substrates especially those substrates often used in cable harnesses such as steel, aluminium, Vamac/Hytrel (trademarks) elastomers, Viton (trademark) rubber and neoprene rubber. In addition, it has been found that the solvent resistance of the adhesive portion of the article is in general similar to that of the dimensionally recoverable portion.

Thus, it is possible to use articles according to the invention in many fields of application where high resistance to liquids is needed, for example in the production of cable harnesses, without the necessity of using an epoxy adhesive to bond different articles together. Where the article is a heat-recoverable article it may be recovered over the substrate by the application of heat, and the heat will cause the adhesive portion to melt and bond the article to the substrate or another such article in a single operation. Tubular articles according to the invention may be recovered over cables to form cable jackets or they may be recovered over an end of a cable attached to an electrical connector in order to protect the electrical connections from corrosion and mechanical stresses caused by handling.

Although the article according to the invention are preferably tubular, articles having other configurations are also within the scope of the invention. For example the article may have a substantially flat configuration, one side of the article comprising the dimensionally recoverable portion and the other side comprising the adhesive portion. Such an article may be used to repair a damaged cable or harness by being wrapped around the damaged portion and held in position during recovery. The article may be used to seal the end of an exposed cable in which case the article may be hollow having one closed end and one open end or it may be tubular in which case one end may be flattened and crimped during recovery.

The article may be formed by a molding process, for example by molding the portion comprising the polyether-ester block copolymer in the desired recovered configuration, cross-linking the polymeric material, expanding the portion either pneumatically or by forcing it over mandrels and applying the adhesive after the expanded portion has been quenched. Preferably, however, the article is an extruded article.

Surprisingly, it has been found that while the segmented polyether-ester block copolymer may be cross-linked on exposure to about 2 to 80 Mrads of high energy radiation, the adhesive used in the article does not cross-link to any significant extent when exposed to such doses, thus allowing both portions of the article to be exposed to the radiation without any detrimental affect to the adhesive. Thus the invention also provides a process for the production of a dimensionally recoverable article, which comprises forming an article comprising a first portion formed from a material comprising a segmented polyether-ester block copolymer and a second, adhesive portion comprising a polyether-ester random copolymer, which portions are intimately bonded together to form a single integral structure, irradiating the article to cross-link the segmented polyether-ester block copolymer, and deforming the article.

The process according to the invention is particularly applicable to the formation of articles by extrusion processes. Thus, the article may be formed by simultaneously extruding the first portion and second, adhesive portion, and bringing the two portions together during or immediately after extrusion or at least while they are still hot so that they will adhere together to form a single integral structure. Where the article is a tubular article it may be formed by a dual extrusion process in which the extrusion die is provided with two concentric circular cavities through which the materials of the different portions are extruded, the adhesive usually being extruded through the inner cavity so that it forms the inner wall of the tube, and while the materials are in the extrusion die they are forced into contact with each other to form the tubular article. The tubular article is then deformed, for example it may be radially expanded when hot by the application of pressure to the interior of the tube followed by quenching to retain the tube in its expanded configuration.

Where the article is in the form of a flat sheet or tape it may be formed either by rolling or extrusion in the form of a sheet or tape and after irradiation uni- or biaxially expanded e.g. on a flat bed expander or, alternatively, it may be extruded as a tube, irradiated and expanded (either radially or axially depending on the intended use of the article), and the tube then slit axially.

The invention will now be described by way of example with reference to the accompanying drawing which is a schematic section of an extrusion die during manufacture of an article according to the invention.

Referring to the accompanying drawing, a tubular article according to the invention is formed by a coextrusion process in which a polyether ester block copolymer composition 1 and a polyester random copolymer composition 2 are simultaneously extruded at a temperature of about 190° C. through a coextrusion die 3 in the form of two concentric tubes 4 and 5 which are forced into contact with each other within the extrusion die, and form an intimate bond with each other. A gas pressure is maintained within the extruded tube to prevent it from collapsing. As the tube is taken off the extrusion die, it is cooled, for example it may be immersed in cold water, and is then ready for the next process step.

After the extruded tube has been allowed to cool it is passed through the chamber of an electron accelerator and is irradiated with electrons of about 6 MeV energy. As it passes through the chamber, the tube is guided over a series of rollers so that it passes through the electron beam a number of times and receives a dose of about 10 Mrads before it leaves the chamber. The irradiated tube is then transferred to a tube expansion apparatus in which the tube is heated to a temperature of about 180° C. by being passed through a bath of hot glycerine. The tube is maintained under an equal internal and external pressure as it passes through the bath, and, as it leaves the bath, the external pressure is reduced causing the tube to expand radially. As soon as the tube has expanded it is cooled rapidly and so retains its expanded shape.

An article according to the invention in the form of a flat sheet may be extruded as such or it may be extruded in the form of a tube and then slit along its length at any stage during the process. If if is extruded in the form of a tube it may be slit before expansion in which case it can be uniaxially expanded (either longitudinally or transversely) or biaxially expanded, on a flat-bed expander, or the tube may be expanded radially or longitudinally before being slit.

The following examples illustrate the invention:

EXAMPLE 1

The following composition was blended using a laboratory Banbury mixer:

| | Parts by weight |
|---|---|
| Hytrel 4055 (trademark) block copolymer of polytetramethylene ether with poly(tetramethyleneterephthalate) | 30 |
| Vamac N123 (ethylene/methyl acrylate elastomer) | 30 |
| Carbon black | 2 |
| Antimony trioxide | 6 |
| Decabromodiphenyl ether | 12 |
| Crodamine IHT (release agent) | 0.375 |
| Triallyl cyanurate | 1 |
| Irganox 1010 (Antioxidant) | 0.375 |
| Whiting (Calcium carbonate) | 16 |
| Stabilizer | 2.25 |

The blended composition was co-extruded with a second blend comprising:

| | Parts by weight |
|---|---|
| Random copolymer of terephthalic acid and polytetramethylene glycol | 98 |
| Carbon black | 2 | in the form of a tube so that the second blend formed the inner wall of the tube. The tube was irradiated with a dose of 10 Mrads of 6 MeV electrons and then expanded radially with an expansion ratio of 3:1.

The peel strength of the tube was measured by slitting the tube axially and wrapping it round at test drum of 25 mm diameter and 25 mm axial length that had previously been cleaned and degreased. The specimen was recovered onto the tube by leaving it in an oven at 150° C. for 20 minutes.

After recovery of the specimen, the drum was mounted with its axis horizontal and so that it was freely rotatable. The specimen was pulled off at a rate of 50±5 mm per minute and the force required to pull the specimen off was recorded as the peel strength.

The test was repeated on a specimen formed from a tube having an outer wall based on polyethylene (RNF 100 sold by Raychem) and an inner wall based on an ethylene vinyl acetate copolymer and an ethylene ethyl acrylate copolymer. The results are given in Table I.

TABLE I

| | Peel Strength (N/25 mm) | |
|---|---|---|
| Substrate (drum) | Specimen according to invention | polyethylene based specimen |
| Aluminum | 240 | 116 |
| Steel | 220 | 90 |
| DR 25 issue 2* | 380 | 75 |
| Neoprene rubber** | 120 | 30 |
| Viton rubber** | 100 | 24 |
| PVC | 60 | 35 |

*Raychem trade name
**DuPont trade name

EXAMPLE 2

Specimens were prepared according to Example 1 and recovered onto an aluminum test drum. The specimens were then immersed in a number of fluids for periods of time before the peel strength was determined as in Example 1. The results are given in Table II.

TABLE II

| | Aluminium Substrate (N/25 mm) Peel Strength (N/25 mm) | | |
|---|---|---|---|
| FLUID | IMMERSION CONDITIONS | SPECIMEN ACCORDING TO THE INVENTION | POLYETHYLENE BASED SPECIMEN |
| — (Control) | — | 240 | 116 |
| Diesel Fuel (F-54) | 24 hours at 22° C. | 200 | 80 |
| Lubricating Oil (0.149) | 24 hours at 22° C. | 200 | 100 |
| Hydraulic Oil (H 515) | 24 hours at 22° C. | 210 | 84 |
| Toluene | 24 hours at 22° C. | 180 | 30 |
| Methylethylketone | 24 hours at 22° C. | 160 | 35 |
| Methylene Chloride | 24 hours at 22° C. | 140 | 25 |
| Water | 720 hours at 50° C. | 180 | 110 |

EXAMPLE 3

The following composition was blended using a laboratory Banbury mixer:

| | Parts by weight |
|---|---|
| Hytrel 4056 (Trademark) | 60 |
| Carbon black | 2 |
| Antimony trioxide | 6 |
| Decabromodiphenyl ether | 12 |
| Crodamine IHT (release agent) | 0.375 |
| Triallyl cyanurate | 1 |
| Irganox 1010 (antioxidant) | 0.375 |
| Silica | 16 |
| Stabilizer | 2.25 |

The composition was co-extruded with a second blend as described in Example 1 in the form of a tube so that the second blend formed the inner wall of the tube. Peel strengths to various substrates and after immersion in various fluids may be determined according to Example 1 and 2, and similar values are obtained.

EXAMPLE 4

Tubes prepared according to Example 1 were immersed in a number of fluids for periods of time and certain physical properties (tensile strength elongation at break, and increase in weight) were measured. The results are given in Table III in which the tensile strength and elongation at break values are expressed as a percentage of the values before immersion.

TABLE III

| FLUID | Time (Hrs.) | Temp. (°C.) | TENSILE STRENGTH | ELONGATION | WEIGHT UPTAKE % |
|---|---|---|---|---|---|
| ASTM No. 2 | 72 | 100 | 106 | 108 | 5 |
| Diesel Fuel BS2869 | 168 | 100 | 35 | 60 | 21 |
| F-54 | 72 | 100 | 84 | 76 | 8 |
| JP4 (F-40) | 24 | 70 | 68 | 96 | 6 |
| Petrol (F-46) | 24 | 70 | 72 | 81 | 7 |
| Transformer Oil (BS148) | 72 | 100 | 90 | 96 | 4 |
| Engine Oil Shell Talone 945 | 72 | 100 | 100 | 100 | — |
| Lubricating Oil (O-149) | 72 | 100 | 77 | 95 | — |
| Hydraulic Oil (H-515) | 72 | 100 | 110 | 125 | 2 |
| Turbo Oil | 24 | 50 | 76 | 95 | — |
| Brake Fluid (H-542) | 24 | 50 | 82 | 90 | — |

EXAMPLE 5

Two blends as described in Example 1 were co-extruded in the form of a tube of 1.5 inches in diameter. Different portions of the tube were irradiated with varying doses of high energy electrons (circa 6 MeV) and the properties of the adhesive were tested by measuring the peel strength in the "T-peel" mode and the melt viscosity of the adhesive. The results are given in Table IV.

TABLE IV

| Beam Dose Mrads | Peel Strength N/25 mm | Melt Viscosity of Adhesives 200° C. |
|---|---|---|
| 0 (Control) | 180 | 210 |
| 2.5 | 175 | 200 |
| 5.0 | 189 | 195 |
| 7.5 | 146 | 195 |
| 10.0 | 174 | 190 |
| 15.0 | 162 | 190 |
| 20.0 | 178 | 180 |

From these results it can be seen that the adhesive is substantially unaffected by doses up to 20 MeV. Cross-linking of the adhesive layer would decrease the peel strength values while chain scission would decrease the melt viscosity values considerably.

I claim:

1. An article which comprises a dimensionally recoverable portion formed from a material comprising a cross-linked segmented polyether-ester block copolymer, and a hot-melt adhesive portion comprising a substantial non-cross-linked polyether-ester random copolymer derived from at least one aromatic dicarboxylic acid and at least one polymerized glycol having varying degrees of polymerization throughout the polyester, which portions are bonded together to form a single integral structure.

2. An article as claimed in claim 1, wherein the segmented polyether-ester block copolymer comprises recurring short chain ester units of the general formula:

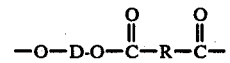

and long chain ester units of the general formula:

$$-O-G-O-\overset{O}{\underset{\|}{C}}-R-\overset{O}{\underset{\|}{C}}-$$

wherein G represents a divalent radical remaining after the removal of terminal hydroxyl groups from at least one long chain glycol having a molecular weight of about 600-6000; R is a divalent radical remaining after removal of carboxyl groups from at least one dicarboxylic acid having a molecular weight less than about 300; and D is a divalent radical remaining after removal of hydroxyl groups from at least one low molecular weight diol having a molecular weight less than 250.

3. An article as claimed in claim 2, wherein the polyether-ester block copolymer comprises recurring short-chain ester units of the formula:

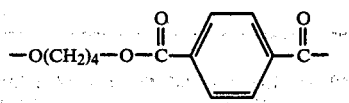

and long-chain ester units of the general formula

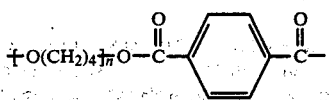

wherein n is an integer in the range of from 6 to 40.

4. An article as claimed in any one of claims 1 to 3, wherein the numerical forming the dimensionally-recoverable portion includes one or more elastomers.

5. An article as claimed in claim 1, wherein the material forming the dimensionally-recoverable portion includes an ethylene/acrylic ester elastomer or an ethylene/vinyl acetate elastomer.

6. An article as claimed in claim 1, wherein the material forming the dimensionally-recoverable portion includes an ethylene/alkyl acrylate and ethylene/alkyl methacrylate elastomer, wherein the alkyl group of the acrylate or methacrylate has from 1 to 4 carbon atoms and the proportion of the acrylic esters units in the elastomer is in the range of from 2.5 to 8.0 moles per kilogram of the elastomer.

7. An article as claimed in claim 1, wherein the material forming the dimensionally recoverable portion includes an elastomer based on a terpolymer of ethylene with an alkyl acrylate or methacrylate in which the alkyl group has from 1 to 4 carbon atoms, and a third copolymerizable monomer selected from the group consisting of $C_1$ to $C_{12}$ alkyl monoesters or diesters of a butenedioic acid, acrylic acid, methacrylic acid, carbon monoxide, acrylonitrile, vinyl esters, alkyl acrylates or methacrylates in which the alkyl groups have at least 5 carbon atoms, and maleic anhydride.

8. An article as claimed in claim 1, wherein the material forming the dimensionally-recoverable portions includes an ethylene/vinyl acetate elastomer containing at least 35% by weight vinyl acetate.

9. An article as claimed in any one of claims 1 to 3, wherein the material forming the dimensionally-recoverable portion includes an elastomer based on a terpolymer of ethylene, methyl acrylate and a cure-site monomer that has one or more carboxyl groups.

10. An article as claimed in any one of claims 5 to 8, wherein the ratio of elastomer to polyether-ester block copolymer in the dimensionally-recoverable portion is in the range of from 1:4 to 4:1 by weight.

11. An article as claimed in any one of claims 1 to 3, wherein the adhesive portion comprises a random copolymer of at least one dicarboxylic acid and a plurality of polyether glycols, substantially all the polyether glycols having a molecular weight of less than 600.

12. An article as claimed in claim 11, wherein the dicarboxylic acid has a molecular weight of less than 300.

13. An article as claimed in claim 11, wherein the dicarboxylic acid is an aromatic dicarboxylic acid.

14. An article as claimed in claim 13, wherein the dicarboxylic acid has a molecular weight of less than 300.

15. An article as claimed in claim 14, wherein the random copolymer has repeating units of the general formula:

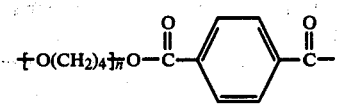

wherein n is an integer that varies from 1 to 7 randomly throughout the copolymer.

16. An article as claimed in claim 1, which is hollow and has an outer portion formed from the cross-linked block copolymer and an inner adhesive portion formed from the random copolymer.

17. An article as claimed in claim 1, which has been formed by extrusion.

* * * * *